(12) United States Patent
Chang (10) Patent No.: US 10,468,961 B1
(45) Date of Patent: Nov. 5, 2019

(54) POWER SOURCE CONTROL CIRCUIT (71) Applicant: MEANWELL (GUANGZHOU) ELECTRONICS CO., LTD., Tianhe, Guangzhou (CN)

(72) Inventor: Kai-Hsiang Chang, New Taipei (TW)

(73) Assignee: MEANWELL (GUANGZHOU) ELECTRONICS CO., LTD., Tianhe, Guangzhou (CN)

( * ) Notice: Subject to any disclaimer, the term of this patent is extended or adjusted under 35 U.S.C. 154(b) by 0 days.

(21) Appl. No.: 16/110,012

(22) Filed: Aug. 23, 2018

(51) Int. Cl.
| | |
|---|---|
| *H02M 3/158* | (2006.01) |
| *H02M 1/08* | (2006.01) |
| *H01F 27/28* | (2006.01) |
| *H02H 5/04* | (2006.01) |
| *H02M 1/00* | (2006.01) |
| *H01F 27/24* | (2006.01) |

(52) U.S. Cl.
CPC .............. *H02M 1/08* (2013.01); *H01F 27/28* (2013.01); *H02M 3/158* (2013.01); *H01F 27/24* (2013.01); *H02H 5/041* (2013.01); *H02M 2001/0009* (2013.01)

(58) Field of Classification Search
CPC .... H02M 3/156; H02M 3/158; H02M 3/1582; H02M 3/1588; H02M 2001/0009
See application file for complete search history.

(56) References Cited

U.S. PATENT DOCUMENTS

| | | | | |
|---|---|---|---|---|
| 6,879,237 | B1* | 4/2005 | Viarouge | H01F 17/043 |
| | | | | 336/212 |
| 8,912,769 | B2* | 12/2014 | Lin | H02M 3/1582 |
| | | | | 323/224 |
| 9,538,601 | B1 | 1/2017 | Mangtani et al. | |
| 9,615,415 | B2 | 4/2017 | Chen et al. | |
| 2012/0062144 | A1 | 3/2012 | Yao et al. | |
| 2012/0268085 | A1 | 10/2012 | Lee et al. | |
| 2013/0207625 | A1 | 8/2013 | Futamura | |
| 2016/0005520 | A1* | 1/2016 | Cheng | H01F 27/04 |
| | | | | 336/90 |

FOREIGN PATENT DOCUMENTS

| | | |
|---|---|---|
| CN | 102215624 A | 10/2011 |
| CN | 102751872 A | 10/2012 |
| CN | 203056969 U | 7/2013 |
| CN | 103248230 B | 12/2016 |
| TW | 201603061 A | 1/2016 |
| TW | 201815045 A | 4/2018 |
| TW | 201824724 A | 7/2018 |

* cited by examiner

*Primary Examiner* — Gary L Laxton
(74) *Attorney, Agent, or Firm* — Li & Cai Intellectual Property (USA) Office (57) ABSTRACT

A power source control circuit is a hysteresis control circuit controlled by current mode. The power source control circuit includes a DC input power source, an input capacitor, a first switching element, a second switching element, an inductor, a current detector, a diode, a third switching element, a hysteresis current controller, and a load. The first end of the inductor is coupled to the second terminal of the first switching element and the first terminal of the second switching element. The second end of the inductor is coupled to the first terminal of the third switching element. The inductor outputs a pulse width modulated output current that is in the PWM mode and that flows into the load.

17 Claims, 7 Drawing Sheets

| 2A | 2B |

POWER SOURCE CONTROL CIRCUIT

FIELD OF THE INVENTION

The present disclosure relates to a power source control circuit; more particularly, to a power source control circuit of a current-mode hysteresis control circuit that outputs current in a pulse width modulation (PWM) mode.

DESCRIPTION OF RELATED ART

Conventionally, feedback control and voltage hysteresis control are adopted for a control circuit of laser diode driver. However, these conventional techniques incur the following disadvantages.

The conventional hysteresis control IC is typically applied by a constant voltage control method. If the conventional hysteresis control IC is to be applied by a constant current control method, a shunt resistor will be utilized as a detector. However, regarding to using a load application that employs high current as for driving, a power consumption of the shunt resistor will be enormous. Further, if a resistance is set to be tremendously low in order to reduce the power consumption of the shunt resistor, an accuracy rate will be limited by hardware specification. Moreover, in actual practice, the conventional constant voltage control method applies the shunt resistor that should be configured at a high-side end of the circuit. Nevertheless, current sense IC generally has a withstand voltage. The higher is the withstand voltage; the lower is the accuracy and the reaction speed. Therefore, the conventional ways should be improved to adapt the future high-voltage circuit.

SUMMARY OF THE INVENTION

Therefore, an aspect of the present disclosure provides a power source control circuit that is configured to drive a high power and high current load. The power source control circuit comprises a direct current input power source (Vin), an input capacitor (C1), a first switching element (Q1), a second switching element (Q2), an inductor (L1), a current detector, a third switching element (Q3), a load, and a hysteresis current controller. The direct current input power source has an anode and a cathode. The input capacitor is in parallel with the direct current input power source. The first switching element has a first terminal that is coupled to the anode of the direct current input power source, a second terminal and a control terminal. The second switching element has a first terminal that is coupled to the second terminal of the first switching element, a second terminal that is coupled to the cathode of the direct current input power source, and a control terminal. The inductor has a first end coupled to the second terminal of the first switching element and a second end, wherein the inductor outputs an output current (Io) in a pulse width modulation (PWM) mode. The current detector is in series connection with the inductor, and is configured to detect the output current and to output a current detecting signal (CC). The third switching element has a first terminal that is coupled to the second end of the inductor, a second terminal that is coupled to the cathode of the direct current input power source, and a control terminal. The load is coupled between the first terminal and the second terminal of the third switching element, and is configured to be driven by the output current. The hysteresis current controller is coupled to the control terminal of the first switching element, the control terminal of the second switching element and the control terminal of the third switching element. The hysteresis current controller is configured to receive the current detecting signal, a pulse and a current controlling signal (PC). The hysteresis current controller is configured to provide driving signals for respectively driving the first, second and third switching elements.

In order to further the understanding of the present disclosure, the following embodiments are provided along with illustrations to facilitate the disclosure of the present disclosure.

DETAILED DESCRIPTION OF TUE PREFERRED EMBODIMENTS

The aforementioned illustrations and following detailed description are exemplary for the purpose of further explaining the scope of the present disclosure. Other objectives and advantages related to the present disclosure will be illustrated in the following description and appended drawings.

It is understood that the term of "switch element" recited in the present disclosure should be able to include many types of switches as long as it can "make" or "break" an electrical circuit, and should not be limited to merely N channel or P channel adopting any one of IGBT, BJT, MOS, CMOS, JFET and MOSFET, or any other types of electronic components. Moreover, regarding the terms "first switching element Q1", "third switching element Q3", "input capacitor C1", "capacitor C10", capacitor CZ1", "diode D1", "diode D2" recited in the present disclosure, the "first", "second", "third", and the abovementioned symbols are functioned as for distinguishing the elements/electronic components from each other, which has nothing to do with the sequence or order. In other words, the following scenario may possibly happened in actual practice that there are merely a first switching element Q1 and a third switching element Q3 without a second switching element Q2 in an embodiment of the present disclosure.

In addition, the terms "first end", "second end", "first terminal", "second terminal", "left side", "right side", "upper side", "lower side" recited in the present disclosure are for further demonstrating the relative positions of the side/end of the elements/electronic components, for further demonstrating the connection relationship between elements/electronic components elements/electronic components of the side/end of the elements/electronic components, or for distinguishing one side/end of the elements/electronic components from the other side(s)/end(s) thereof, which has nothing to do with the sequence or the absolute positions. Furthermore, the term "and/or" includes any one or any other combination of more than one. Besides, the terms "plurality" or "at least two" for descripting multiple elements are not limited to merely two, three, four, or more than four elements.

The present disclosure is configured to drive a high power and high current load. In order to solve the problems of the conventional constant voltage hysteresis control circuit, a solution of the power source control circuit according to the present disclosure is provided to include a buck circuit SR-BUCK as a main structure, a current detector provided by Hall element (Hall CT), and a current-mode-controlled hysteresis control circuit invented by the applicants.

Figure 1:
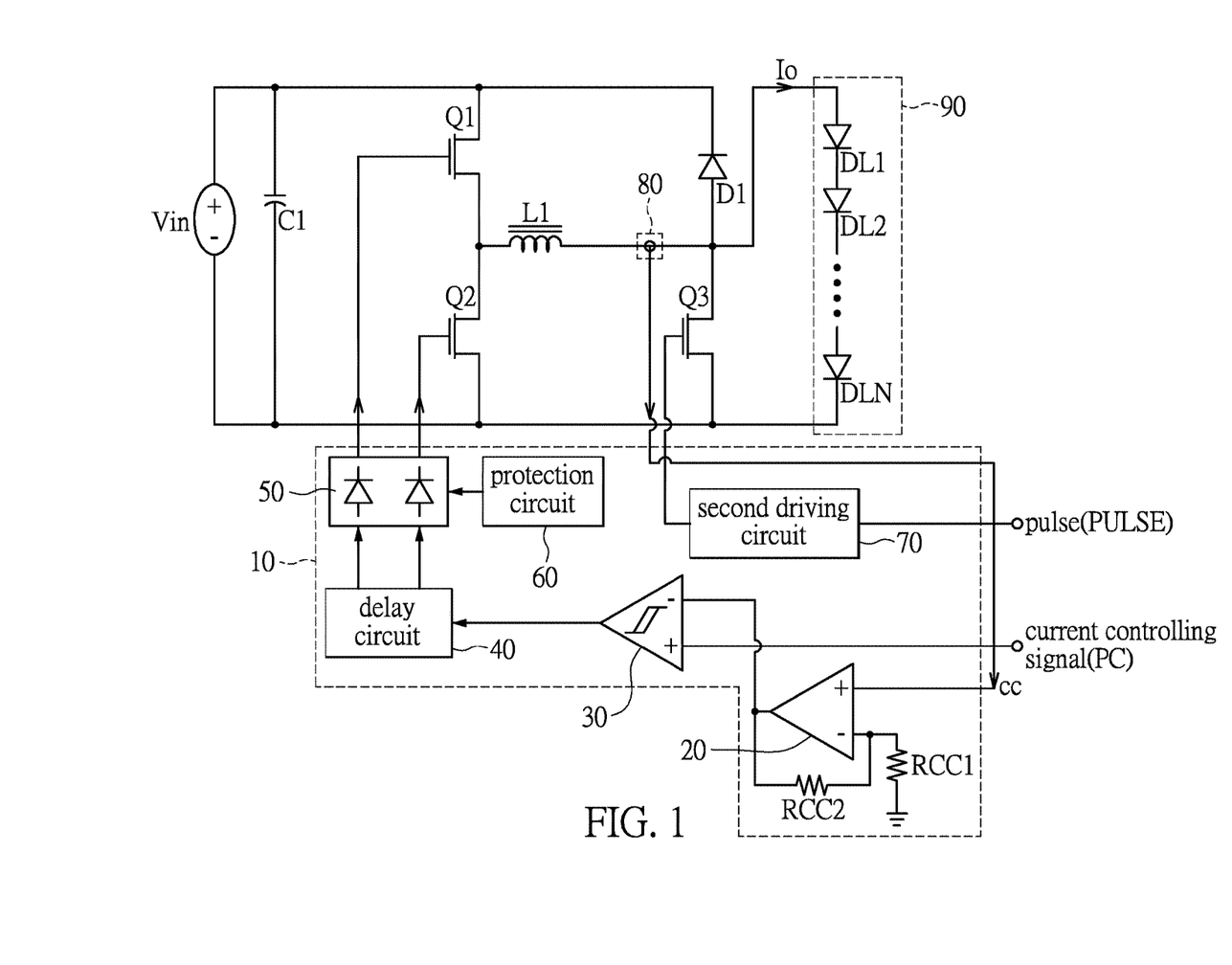
FIG. 1 is a circuit diagram of an embodiment according to the present disclosure.

Referring to FIG. 1, the power source control circuit of the present application includes a direct current input power source (Vin), an input capacitor (C1), a first switching element (Q1), a second switching element (Q2), an inductor (L1), a current detector 80, a diode (D1), a third switching element (Q3), a hysteresis current controller 10 and a load 90. Wherein, the direct current input power source (Vin) may be another direct current power source outputted by an alternating current to direct current (AC/DC) converter in a front side. The input capacitor (C1) is configured in parallel with the direct current input power source (Vin). The first switching element (Q1) has a first terminal (the upper side of the first switching element as shown in FIG. 1), a second terminal (the lower side of the first switching element as shown in FIG. 1) and a control terminal (i.e., the gate terminal of the first switching element as shown in FIG. 1). The first terminal of the first switching element (Q1) is coupled to an anode of the direct current input power source (Vin). Under the similar definition of each of the terminal(s) and end(s) as mentioned above, a first terminal of the second switching element (Q2) is coupled to the second terminal of the first switching element (Q1), a second terminal of the second switching element (Q2) is coupled to a cathode of the direct current input power source (Vin).

The inductor (L1) has a first end (the left side of the inductor as shown in FIG. 1) coupled to the second terminal of the first switching element (Q1). The inductor (L1) outputs an output current (Io) in a pulse width modulation (PWM) mode. The current detector 80 is in series connection with the inductor (L1), and is configured to detect the output current (Io) and to output a current detecting signal (CC) for the following operation of current control. In one embodiment, the current detector 80 is implemented with a Hall current detecting element (Hall CT), but should not be limited thereto. The diode (D1) shown in FIG. 1 has an anode that is coupled to the second end of the inductor (L1), and a cathode that is coupled to the anode of the direct current input power source (Vin). The third switching element (Q3) has a first terminal that is coupled to the anode of the diode (D1), and a second terminal that is coupled to the cathode of the direct current input power source (Vin). The load 90 is coupled between the first terminal and the second terminal of the third switching element (Q3), and is configured to be driven by the output current (Io). In one embodiment, the load 90 of the present application is configured with a plurality of diodes (DL1 to DLN) that are arranged in series. Each of the diodes (DL1 to DLN) may be a laser light-emitting diode (LED). In other words, the load 90 in actual practice could be configured with a plurality of laser LED arranged in series. Moreover, the power source control circuit of the present application can also be applied in LED pulse width modulation (PWM) dimming circuit, in which the load 90 is the load of the LED PWM dimming circuit. Further, the power source control circuit of the present application can also be applied in providing power source of the ultraviolet (UV) coating machine, in which the load 90 is the UV coating machine. Furthermore, the power source control circuit of the present application can also be applied in multiple types of the applications of high speed current pulse. Apparently, the future potential of the present application applying to the machines that requires high voltage and high power is enormous.

The hysteresis current controller 10 shown in FIG. 1 is a circuit designed by the applicants, wherein the hysteresis current controller 10 is coupled respectively to the control terminal of the first switching element (Q1), the control terminal of the second switching element (Q2) and the control terminal of the third switching element (Q3). The hysteresis current controller 10 is configured to receive the current detecting signal (CC), a pulse (PULSE) and a current controlling signal (PC). The hysteresis current controller 10 is configured to provide driving signals for respectively driving the first, second and third switching elements (Q1, Q2, Q3). That is to say, the hysteresis current controller 10 is the main driving circuit for driving the first, second and third switching elements (Q1, Q2, Q3) to execute high frequency switch operation.

The hysteresis current controller 10 is a circuit including a feedback comparator 20, a hysteresis amplifier 30, a delay circuit 40, a first driving circuit 50, a protection circuit 60 and a second driving circuit 70. The feedback comparator 20 has a non-inverting input terminal (+) that is configured to receive the current detecting signal (CC), and an inverting input terminal (−) is configured to be coupled to a grounding and an output terminal of the feedback comparator 20, wherein a first resistor (RCC1) is configured between the inverting input terminal (−) of the feedback comparator and the grounding, and a second resistor (RCC2) is configured between the inverting input terminal (−) of the feedback comparator 20 and the output terminal of the feedback comparator 20. The hysteresis amplifier 30 has a non-inverting input terminal (+) that is coupled to receive the current controlling signal (PC), and an inverting input terminal (−) that is coupled to the output terminal of the feedback comparator 20. The delay circuit 40 has an input end that is coupled to the output terminal of the hysteresis amplifier 30, and the delay circuit 40 outputs a first delay signal (Hin) and a second delay signal (Lin) as shown in FIG. 3. The first driving circuit 50 is configured to receive the first delay signal (Hin) and the second delay signal (Lin), and to output a first H driving signal and a first L driving. The first H driving signal is outputted to the control terminal of the first switching element (Q1), and the first L driving signal is outputted to the control terminal of the second switching element (Q2). The detailed description of the first H driving signal and the first L driving signal will be further demonstrated in FIG. 2A. The second driving circuit 70 is configured to receive the pulse (PULSE), and to output a second OUT driving signal. The second OUT driving signal is outputted to the control terminal of the third switching element (Q3). The detailed description will be further demonstrated in FIG. 2B.

The protection circuit 60 is coupled to and outputs a signal to the first driving circuit 50 for protecting the circuit. In actual practice, the protection circuit 60 is logic or gate of an OFF-latch, wherein the logic or gate is configured to receive an over-current-protection (OCP) signal and an over-temperature-protection (OTP) signal, and to output a turn-off signal to the first driving circuit 50. When either an over-current situation or an over-temperature situation is happened, output of the driving signal of the first driving circuit 50 will be turned off and thereby terminating operation of the entire power source control circuit.

It is noted that there is no configuration of large capacitor at the output side of the abovementioned main structure of the circuit shown in FIG. 1 of the present application. Generally speaking, a large capacitor is configured at the output side of the buck converter circuit so as to successively deliver the power and to reduce the ripple. However, the reason of not disposing large capacitor is that, when the present application is applied in laser-related load 90, the output in a pulse width modulation (PWM) form does not need to successively deliver the power. Therefore, the operation of reducing the ripple can be completely relied on the inductor (L1). In one embodiment, the output frequency of the present application is 5 kHz and the output current is ranging between 0-50 amperes (A).

Figures 2, 2A:
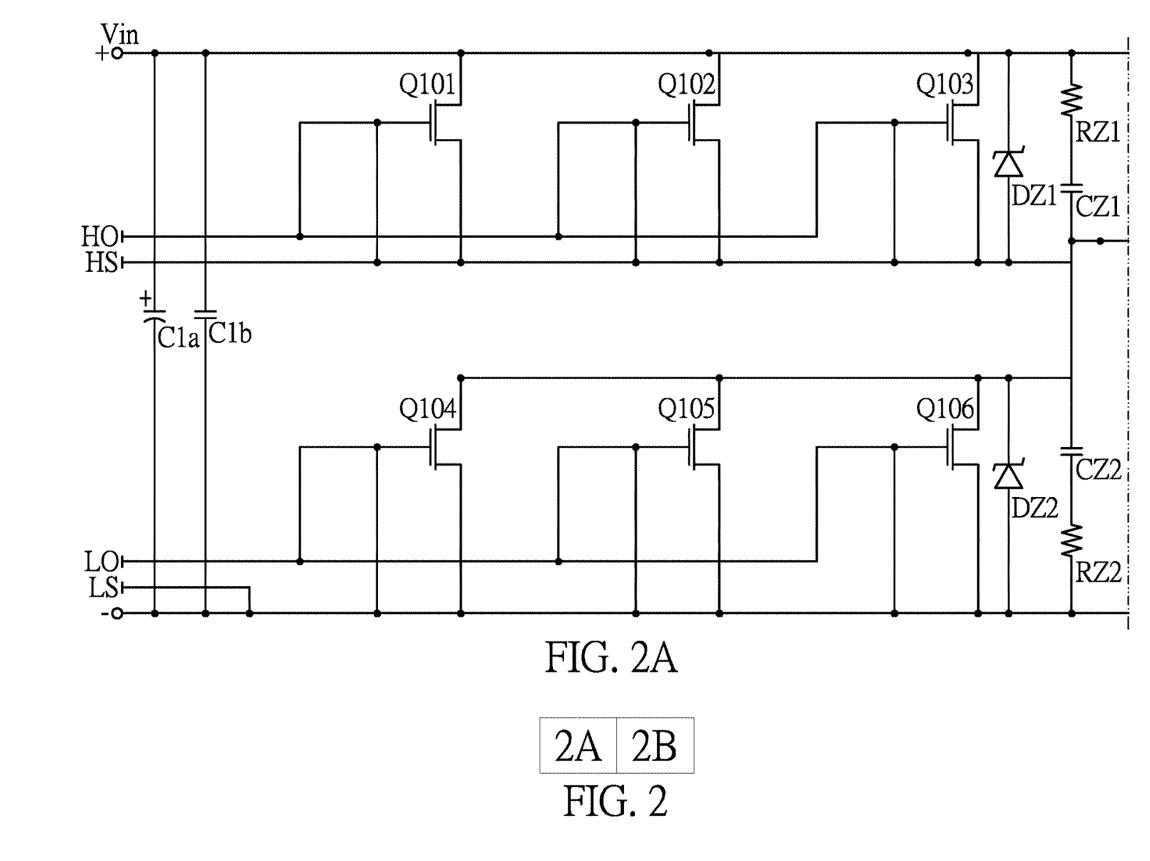
FIG. 2 is a circuit diagram combining FIG. 2A and FIG. 2B according to the present disclosure.
FIG. 2A is a circuit diagram showing one part of a main circuit of the embodiment according to the present disclosure.
Figure 2B:
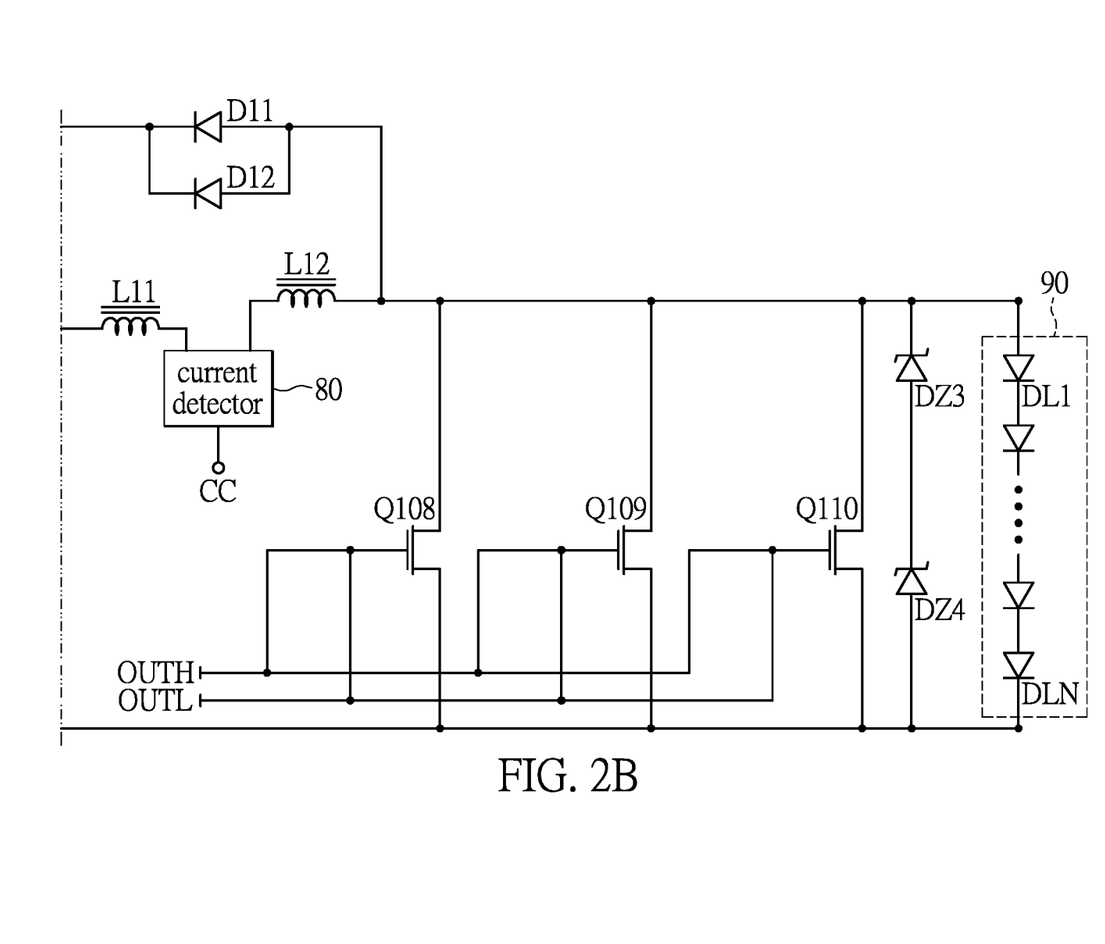
FIG. 2B is a circuit diagram showing another part of the main circuit of the embodiment according to the present disclosure.
Figure 3:
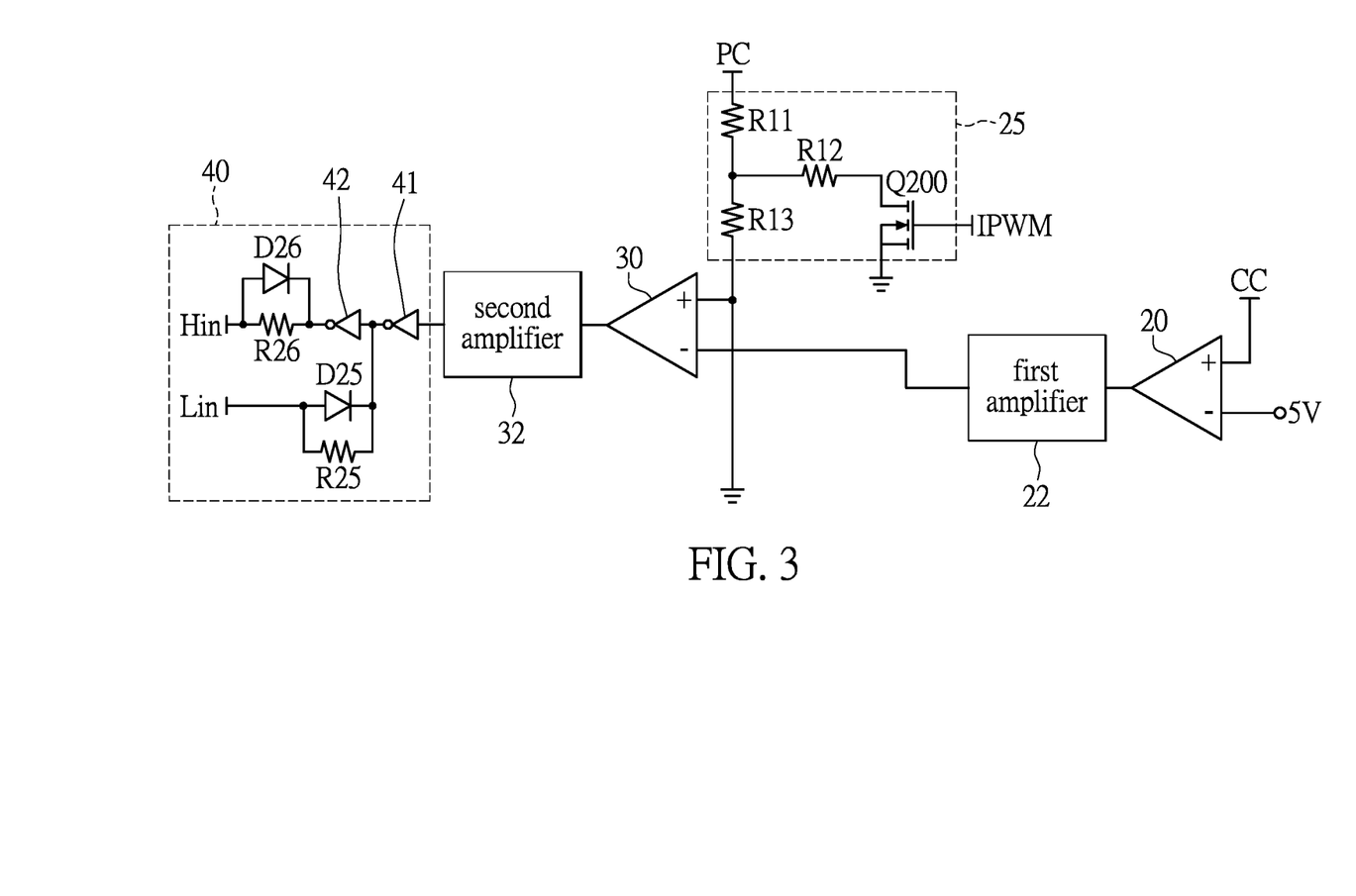
FIG. 3 is a circuit diagram showing a part of an interior of a hysteresis current controller of the embodiment according to the present disclosure.

FIG. 2 is a circuit diagram combining FIG. 2A and FIG. 2B according to the present disclosure, which further demonstrates an embodiment of the main circuit structure shown in FIG. 1. The abovementioned first switching element (Q1) is combined with a switch (Q101), a switch (Q102) and a switch (Q103) that are configured in parallel connection. The second switching element (Q2) is combined with a switch (Q104), a switch (Q105) and a switch (Q106) that are configured in parallel connection. The third switching element (Q3) is combined with a switch (Q107), a switch (Q108) and a switch (Q109) that are configured in parallel connection.

The first H driving signal includes a first HO driving signal and a first HS driving signal. The first L driving signal includes a first LO driving signal and a first LS driving signal. The first HO driving signal is outputted to the control terminal of the switch (Q101), to the control terminal of the switch (Q102) and to the control terminal of the switch (Q103). The first HS driving signal is outputted to the control terminal of the switch (Q101) and the second terminal of the switch (Q101), to the control terminal of the switch (Q102) and the second terminal of the switch (Q102), and to the control terminal of the switch (Q103) and the second terminal of the switch (Q103). Moreover, the first LO driving signal is outputted to the control terminal of the switch (Q104), to the control terminal of the switch (Q105), and to the control terminal of the switch (Q106). The first LS driving signal is outputted to the control terminal of the switch (Q104) and the second terminal of the switch (Q104), to the control terminal of the switch (Q105) and the second terminal of the switch (Q105), and to the control terminal of the switch (Q106) and the second terminal of the switch (Q106).

In one embodiment, if the power source control circuit includes merely the first switching element (Q1) as shown in FIG. 1, the first HO driving signal is outputted to the control terminal of the first switching element (Q1), and the first HS driving signal is outputted to the control terminal of the first switching element (Q1) and the second terminal of the first switching element (Q1). Similarly, if the power source control circuit includes merely the second switching element (Q2) as shown in FIG. 1, the first LO driving signal is outputted to the control terminal of the second switching element (Q2), and the first LS driving signal is outputted to the control terminal of the second switching element (Q2) and the second terminal of the second switching element (Q2).

Referring to FIG. 2A, a diode (DZ1) is connected in parallel between a first end of the switch (Q103) and a second end of the switch (Q103). In actual practice, the diode (DZ1) is a clamped diode, which clamps the voltage between the first end and the second end of the switch (Q103) within a predetermined voltage level. The diode (DZ1) is in parallel connection with a series circuit of a resistor (RZ1) and a capacitor (CZ1). Similarly, a diode (DZ2) is connected in parallel between a first end of the switch (Q106) and a second end of the switch (Q106). In actual practice, the diode (DZ2) is a clamped diode, which clamps the voltage between the first end and the second end of the switch (Q106) within a predetermined voltage level. The diode (DZ2) is in parallel connection with a series circuit of a resistor (RZ2) and a capacitor (CZ2).

FIG. 2B shows another embodiment of the inductor (L1). The inductor (L1) further includes a first inductor (L11) and a second inductor (L12), wherein the first inductor (L11) and current detector 80 is in series connection. In other words, the current flowing through the inductor (L1) flows through the first inductor (L11) and the second inductor (L12) to output. In particular, an end of the first inductor (L11) is coupled to an end of the current detector 80, and the another end of the current detector 80 (i.e., current outputting end) is coupled to an end of the second inductor (L12) so as to output the output current (Io) to the load 90. In such manner of connection, the current detector 80 is able to detect the current status of the output current (Io) for reference of the current control. The diode (D1) includes a first diode (D11) and a second diode (D12). The first diode (D11) and the second diode (D12) are in parallel connection. It should be noted that, in actual practice of inductor winding, the inductor (L1) may be a single inductor as shown in FIG. 1, but may also include the first inductor (L11) and the second inductor (L12) connected in series with each other as shown in FIG. 2B. The present application should not be limited thereto.

Regarding the third switching element (Q3), which is combined with a switch (Q108), a switch (Q109) and a switch (Q110) that are configured in parallel connection. The second OUT driving signal includes a second OUTH driving signal and a second OUTL driving signal. The second OUTH driving signal is outputted to the control terminal of the switch (Q108), to the control terminal of the switch (Q109), and to the control terminal of the switch (Q110). The second OUTL driving signal is outputted to the control terminal of the switch (Q108), to the control terminal of the switch (Q109), and to the control terminal of the switch (Q110).

In one embodiment, if the power source control circuit includes merely the third switching element (Q3), the second OUTH driving signal is outputted to the control terminal of the third switching element (Q3), and the second OUTL driving signal is outputted to the control terminal of the third switching element (Q3). Moreover, the load 90 shown in FIG. 2B is in parallel connection with a series circuit of a diode (DZ3) and a diode (DZ4). In such manner, a voltage between a first end and a second end of the load 90 can be clamped within a voltage level formed by the series circuit of the diode (DZ3) and the diode (DZ4).

FIG. 3 further shows the circuit of the feedback comparator 20, the hysteresis amplifier 30 and the delay circuit 40. The non-inverting input terminal (+) of the feedback comparator 20 is configured to receive the current detecting signal (CC). The inverting input terminal (−) of the feedback comparator 20 is configured to be coupled to a voltage source of direct current 5V. In one embodiment, a first amplifier 22 is coupled between the feedback comparator 20 and the hysteresis amplifier 30. The first amplifier 22 is configured to amplify output signals of the feedback comparator 20. An output terminal of the first amplifier 22 is further coupled to circuit of the hysteresis amplifier 30.

The non-inverting input terminal (+) of the hysteresis amplifier 30 is coupled to a filter circuit 25. The filter circuit 25 includes a resistor (R11), a resistor (R12), a resistor (R13), and a switch (Q200). A first end of the resistor (R11), which is shown at upper side of the resistor (R11) in FIG. 3, is configured to receive the current controlling signal (PC). A first end of the resistor (R12), which is shown at left side of the resistor (R12) in FIG. 3, is coupled to a second end of the resistor (R11), which is shown at lower side of the resistor (R11) in FIG. 3. A first end of the resistor (R13), which is shown at upper side of the resistor (R13) in FIG. 3, is coupled to a second end of the resistor (R11). A second end of the resistor (R13), which is shown at lower side of the resistor (R13) in FIG. 3, is coupled to the non-inverting input terminal (±) of the hysteresis amplifier 30. A first terminal of the switch (Q200) is coupled to the second end of the resistor (R12). A second terminal of the switch (Q200) is coupled to be grounded. A control terminal of the switch (Q200) is coupled to receive a current pulse controlling signal (IPWM).

In addition, as shown in FIG. 3, when the pulse (PULSE) is in pulse width modulation, current pulse is generated by output of each of the switches while executing ON/OFF switching of the shunt. Since electricity power stored in the inductor (L1) still remains therein even when the short circuit of the output is happened, situations of current spike and overshoot due to the high speed di/dt may occur when the current pulse is sent. In order to prevent the situations from happening, the power source control circuit of the present application may meanwhile reduce the voltage level of the current controlling signal (PC) even when the short circuit of the output is happened. As a result, the electricity power stored in the inductor (L1) will be decreased, and the situations of current spike and overshoot will also be alleviated.

By virtue of switching function of the switch (Q200), the filter circuit 25 can alleviate situation of the spike. Further referring to circuit diagrams in FIGS. 2A and 2B, the main structure of the present application has two statuses of: the power-delivery status, in which the power is transmitted through the switch (Q101), switch (Q102), switch (Q103), the first inductor (L11) and the second inductor (L12) to output; the no-power-delivery status, in which the switch (Q104), switch (Q105), switch (Q106), switch (Q108), switch (Q109) and switch (Q110) breakdown, and the output is short-circuit.

In the no-power-delivery status, the inductor element still has the electricity power remaining therein. As a result, when the current status is switched to the other one, the situation of spike (i.e., SP) will occur, annotated as symbol SP shown in waveform of the output current (Io) of FIG. 8. Therefore, to solve the problem of spike in the no-power-delivery status is to change the voltage value of feedback (i.e., the switch Q200 will change divided voltage of the feedback) so as to decrease remaining electricity power stored in the inductor element, thereby solving problem of spike. Wherein, the symbol annotated as PC is the current controlling signal for controlling the current.

The inverting input terminal (−) of the hysteresis amplifier 30 is coupled to the output terminal of the first amplifier 22. In one embodiment, a second amplifier 32 is further coupled to the hysteresis amplifier 30 and the delay circuit 40. The second amplifier 32 is configured to amplify output signals of the hysteresis amplifier 30. An output terminal of the second amplifier 32 is further coupled to the delay circuit 40.

The delay circuit 40 shown in FIG. 3 includes a first inverter 41 and a second inverter 42. An input terminal of the first inverter 41 is coupled to the resistor 24. An output terminal of the first inverter 41 is coupled to an input terminal of the second inverter 42. An output terminal of the second inverter 42 is coupled to a resistor R26. An end (shown in left side of the resistor R26 of FIG. 3) of the resistor R26 outputs the first delay signal (Hin). The Resistor (R26) is in parallel connection with a diode (D26). A cathode of the diode (D26) is coupled to the output terminal of the second inverter 42. An output terminal of the first inverter 41 is coupled to a resistor (R25). An end (shown in left side of the resistor R25 of FIG. 3) of the resistor (R25) outputs the second delay signal (Lin). The Resistor (R25) is in parallel connection with a diode (D25). A cathode of the diode (D25) is coupled to the output terminal of the first inverter 41. As shown in FIG. 3, the first delay signal (Hin) and the second delay signal (Lin) are outputted to the first driving circuit 50 for driving the first switching element (Q1) and the second switch element (Q2) to execute the switching operation.

Figure 4:
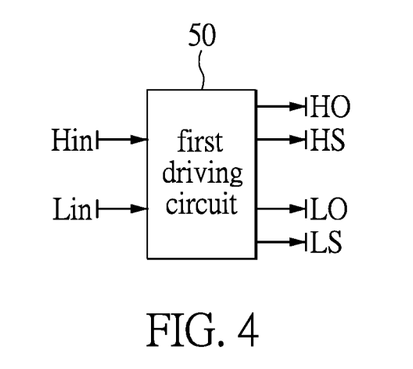
FIG. 4 is a schematic diagram showing an input/output signal of a first driving circuit of the embodiment according to the present disclosure.

FIG. 4 shows that the first driving circuit 50 is to receive the first delay signal (Hin) and the second delay signal (Lin) and to output the first HO driving signal, the first HS driving signal, the first LO driving signal and the first LS driving signal. In actual practice, the first driving circuit 50 is configured by an IC component of system-on-chip (SoC). By inserting regulations of power source and related traces layout into the IC component, the first driving circuit 50 is able to receive the first delay signal (Hin) and the second delay signal (Lin) and to output the first HO driving signal, the first HS driving signal, the first LO driving signal and the first LS driving signal.

Figure 5:
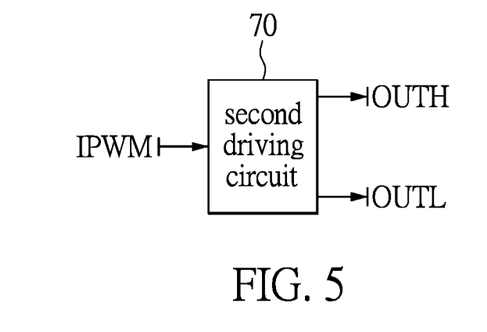
FIG. 5 is a schematic diagram showing an input/output signal of a second driving circuit of the embodiment according to the present disclosure.

Similarly, FIG. 5 is a schematic diagram of the second driving circuit 70. In actual practice, the second driving circuit 70 is configured by an IC component of system-on-chip (SoC). By inserting regulations of power source and related traces layout into the IC component, the second driving circuit 70 is able to convert the received current pulse controlling signal (IPWM) into the second OUTH driving signal and the second OUTL driving signal to output.

Figure 6:
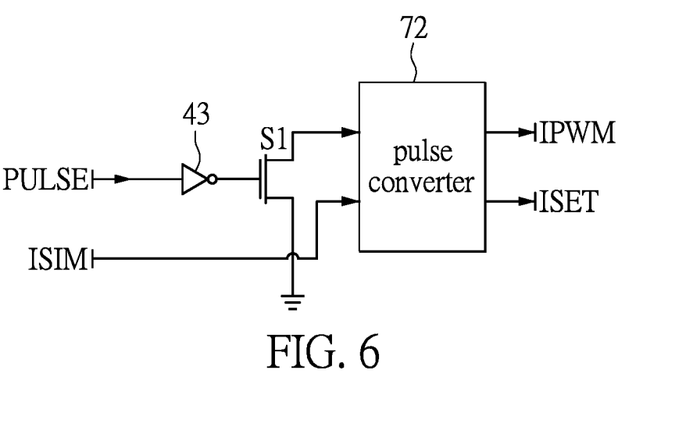
FIG. 6 is a schematic diagram showing a current controlled signal of the embodiment according to the present disclosure.

FIG. 6 demonstrates one embodiment to convert the pulse (PULSE) into the current pulse controlling signal (IPWM) through a connection of a pulse converter 72 which can be compared to inputting the pulse (PULSE) to the second driving circuit 70 shown in FIG. 1. The pulse (PULSE) signal is transmitted to an input terminal of a third inverter 43. An output terminal of the third inverter 43 is coupled to a control terminal of a switch unit (S1). A first terminal (upper side of the switch unit S1 shown in FIG. 6) of the switch unit (S1) is configured as an input terminal of the pulse converter 72. A second terminal of the switch unit (S1) is configured to be grounded.

On the other hand, the input terminal of the pulse converter 72 further includes a current displacement control signal (ISIM). The ON/OFF of the current displacement control signal (ISM) together with the ON/OFF of the pulse (PULSE) are able to control different current controlling modes so as to generate the output current (Io) with different current pulse waveforms. Therefore, the embodiments of the present application are capable of adjusting different current controlling modes based on the different needs of the loads, and are also suitable for applications with program current. In actual practice, the pulse converter 72 is configured by an IC component of system-on-chip (SoC). The pulse converter 72 outputs the current pulse controlling signal (IPWM) and a current setting signal (ISET).

Figure 7:
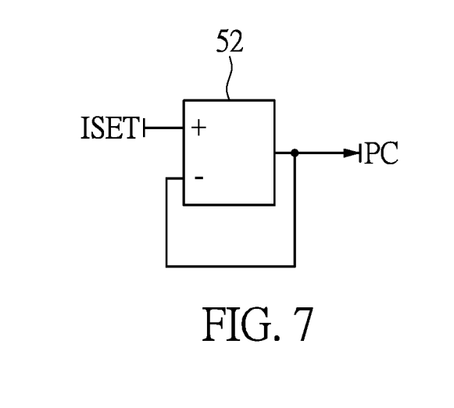
FIG. 7 is a schematic diagram showing a current pulse controlled signal of the embodiment according to the present disclosure.

FIG. 7 shows the current setting signal (ISET) to be operated by the amplifier 52 to generate the current controlling signal (PC). The current setting signal (ISET) is transmitted to the non-inverting input terminal (+) of the amplifier 52. The inverting input terminal (−) of the amplifier 52 is coupled to the output terminal of the amplifier 52. The output terminal of the amplifier 52 is to output the current controlling signal (PC).

Figure 8:
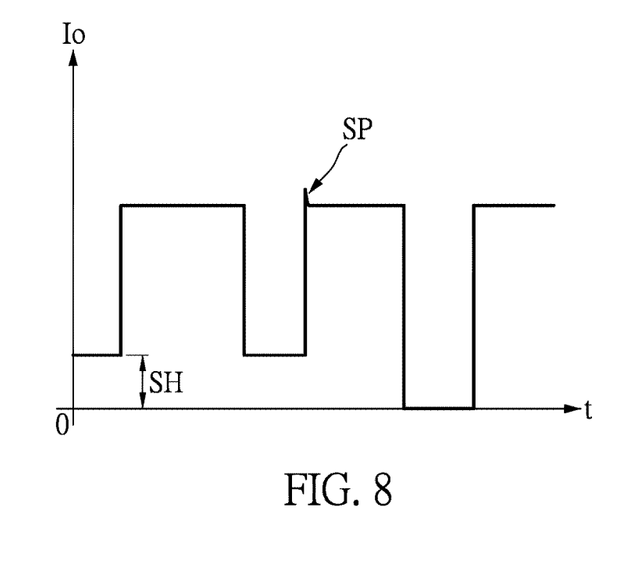
FIG. 8 is a schematic diagram showing a waveform of an output current of the embodiment according to the present disclosure.

FIG. 8 is a schematic diagram showing a waveform of the output current (Io), wherein the output current (Io) is in a pulse width modulation (PWM) form. Moreover, the output current (Io) can be adjusted to vary a current displacement (SH) according to user's need of the load 90. The current displacement (SH) may not necessarily start from a zero level. However, in the following modulation, the current displacement (SH) may be modulated to start from the zero level according to the user's need. That is to say, the output current (Io) of the present application can be adjusted to have a displacement level based on the needs of the loads, wherein the displacement level is the current displacement (SH) shown in the FIG. 8. Apparently, the power source control circuit of the present application can execute different modulation of the output current (Io) based on different needs of the loads, and thereby improving the deficiency of the conventional techniques. The symbol annotated as SP in FIG. 8 is the spike, which can be filtered by the filter circuit 25 shown in FIG. 3.

Figure 9:
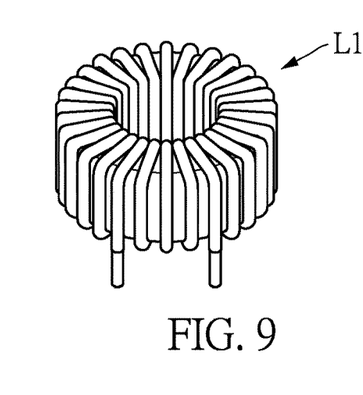
FIG. 9 is a schematic diagram showing an embodiment of an inductor according to the present disclosure.

FIG. 9 shows an embodiment of the inductor (L1) that can include the first inductor (L11) and the second inductor (L12) in series connection. An iron core of the inductor (L1) is made of soft magnetic materials in one embodiment of the present application, and the material of the iron core includes composition of iron and silicon. The iron core is entirely coated with epoxy resin and has a structure of flat cylinder with a concentric circle. The iron core has two groups of coils to configure the first inductor (L11) and the second inductor (L12). The inductor (L1) is configured by the first inductor (L11) and the second inductor (L12) that is in series connection with the first inductor (L11). In other words, the iron cores of the first inductor (L11) and the second inductor (L12) are also made of soft magnetic materials. The material of the iron cores of the first inductor (L11) and the second inductor (L12) also include composition of iron and silicon. The iron cores of the first inductor (L11) and the second inductor (L12) are entirely coated with epoxy resin. An end of the first inductor (L11) is coupled to an end of the current detector 80. Another end of the current detector 80 is couple to an end of the second inductor (L12) for detecting the output current (Io). The current detector 80 in actual practice is implemented by a Hall current converting element (Hall CT).

Figure 10:
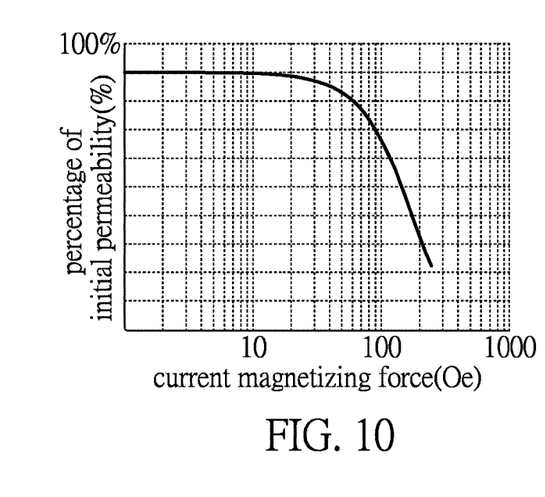
FIG. 10 is a curve chart demonstrating characteristics of the inductor of the embodiment according to the present disclosure.

FIG. 10 is a curve chart demonstrating characteristics of the inductor of the embodiment according to the present disclosure. When a direct current magnetizing force (Oe, horizontal axis) of the inductor (L1) is greater than a predetermined threshold value, a percentage of initial permeability (%, vertical axis) decreases slowly and thereby presenting a nonlinear magnetic permeability. The permeability of the power source control circuit according to the present application is effective on ripple cancellation. Moreover, the power source control circuit according to the present application is able to control the broader frequency band, resulting in faster transient response and is easy to be controlled in the interval of the slowly decreasing.

Figure 11:
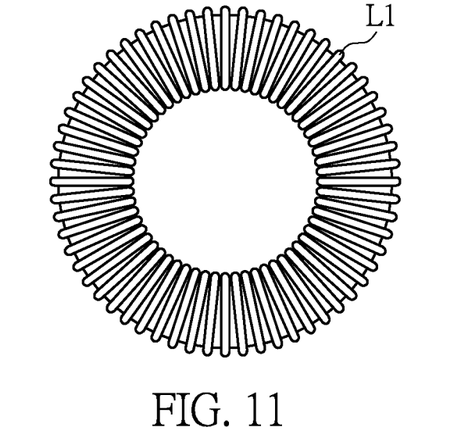
FIG. 11 is a schematic diagram another embodiment of the inductor according to the present disclosure.
Figure 12:
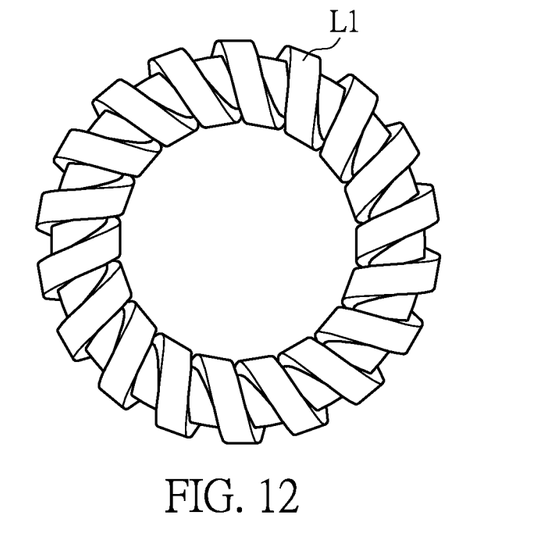
FIG. 12 is a schematic diagram showing yet another embodiment of the inductor according to the present disclosure.

FIG. 11 shows an embodiment of the inductor (L1) of the present application. The inductor (L1) is manufactured by the iron core that is winded with numbers of turns of cylindrical coils, wherein the coil winding includes at least orthocyclic winding, helical winding and wild winding. FIG. 15 shows another embodiment of the inductor (L1) of the present application. The inductor (L1) is manufactured by the iron core that is winded with numbers of turns of flat coils, wherein the coil winding includes at least orthocyclic winding, helical winding and wild winding. In one embodiment according to the present application, a weight of an iron core of the inductor (L1) is ranging between 290 g to 330 g, wherein the output current (Io) can be greater than 50 A. In other embodiment of the present application, in which the inductor (L1) is configured by the first inductor (L11) and the second inductor (L12) in series connection, a weight of the iron core of the first inductor (L11) is ranging between 145 g to 165 g, and a weight of an iron core of the second inductor (L12) is ranging between 145 g to 165 g, wherein the output current (Io) can be greater than 50 A as well. In addition to that, the weight of the iron core of the first inductor (L11) can be different from that of the second inductor (L12). The weights of the first inductor (L11) and the second inductor (L12) may be adjustable for sake of the layout on a printed circuit board, but the total weight should be greater than 250 g.

The power source control circuit of the present disclosure improves the performance of the traditional constant voltage hysteresis control and provides the high accuracy controlling effectively. This disclosure controls the power source with fast response, high voltage and high power situation, and it is also suitable for applications with Program Current. Furthermore, the circuit application may be simplified by virtue of the present disclosure.

The description illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A power source control circuit configured to drive a high power and high current load, the power source control circuit comprising:

a direct current input power source (Vin) having an anode and a cathode;

an input capacitor (C1) being in parallel with the direct current input power source;

a first switching element (Q1) having a first terminal that is coupled to the anode of the direct current input power source, a second terminal and a control terminal;

a second switching element (Q2) having a first terminal that is coupled to the second terminal of the first switching element, a second terminal that is coupled to the cathode of the direct current input power source, and a control terminal;

an inductor (L1) having a first end coupled to the second terminal of the first switching element and a second end, wherein the inductor outputs an output current (Io) in a pulse width modulation (PWM) mode;

a current detector, being in series connection with the inductor, and configured to detect the output current and to output a current detecting signal (CC);

a third switching element (Q3) having a first terminal that is coupled to the second end of the inductor, a second terminal that is coupled to the cathode of the direct current input power source, and a control terminal;

a load coupled between the first terminal of the third switching element and the second terminal of the third switching element, and configured to be driven by the output current; and a hysteresis current controller coupled to the control terminal of the first switching element, the control terminal of the second switching element and the control terminal of the third switching element;

a feedback comparator having a non-inverting input terminal, an inverting input terminal and an output terminal; and a hysteresis amplifier having a non-inverting input terminal and an inverting input terminal that is coupled to the output terminal of the feedback comparator, wherein the hysteresis current controller receives the current detecting signal, a pulse and a current controlling signal (PC), and wherein the non-inverting input terminal of the hysteresis amplifier is coupled to receive the current controlling signal, and wherein the hysteresis current controller is configured to provide driving signals for respectively driving the first, second and third switching elements.

2. The power source control circuit according to claim 1, wherein the non-inverting input terminal of the feedback comparator is configured to receive the current detecting signal, and the inverting input terminal of the feedback comparator is configured to be coupled to a grounding and the output terminal of the feedback comparator, wherein a first resistor (RCC1) is configured between the inverting input terminal of the feedback comparator and the grounding, and a second resistor (RCC2) is configured between the inverting input terminal of the feedback comparator and the output terminal of the feedback comparator.

3. The power source control circuit according to claim 1, wherein the hysteresis current controller includes:

a delay circuit that has an input end coupled to the output terminal of the hysteresis amplifier and that outputs a first delay signal (Hin) and a second delay signal (Lin).

4. The power source control circuit according to claim 1, wherein the hysteresis current controller includes:

a first driving circuit configured to receive the first delay signal and the second delay signal, and to output a first H driving signal to the control terminal of the first switching element and a first L driving signal to the control terminal of the second switching element.

5. The power source control circuit according to claim 4, wherein the first H driving signal includes a first HO driving signal and a first HS driving signal, wherein the first HO driving signal is outputted to the control terminal of the first switching element, and the first HS driving signal is outputted to the control terminal of the first switching element and the second terminal of the first switching element.

6. The power source control circuit according to claim 4, wherein the first L driving signal includes a first LO driving signal and a first LS driving signal, wherein the first LO driving signal is outputted to the control terminal of the second switching element, and the first LS driving signal is outputted to the control terminal of the second switching element and the second terminal of the second switching element.

7. The power source control circuit according to claim 1, wherein the hysteresis current controller includes:

a second driving circuit configured to receive the pulse, and to output a second OUT driving signal to the control terminal of the third switching element.

8. The power source control circuit according to claim 7, wherein the second OUT driving signal includes a second OUTH driving signal and a second OUTL driving signal, wherein the second OUTH driving signal is outputted to the control terminal of the third switching element, and the second OUTL driving signal is outputted to the control terminal of the third switching element.

9. The power source control circuit according to claim 1, wherein the hysteresis current controller includes a filter circuit including:

a resistor R11 having a first end that is configured to receive the current controlling signal, and a second end;

a resistor R12 having a first end that is coupled to the second end of the resistor R11, and a second end;

a resistor R13 having a first end that is coupled to the second end of the resistor R11, and a second end that is coupled to the non-inverting input terminal of the hysteresis amplifier; and a switch Q200 having a first terminal that is coupled to the second end of the resistor R12, a second end that is coupled to the grounding, and a control terminal that is coupled to receive a current pulse controlling signal (IPWM).

10. The power source control circuit according to claim 1, wherein the hysteresis current controller includes a protection circuit that is logic or gate of an OFF-latch, wherein the logic or gate is configured to receive an over-current-protection (OCP) signal and an over-temperature-protection (OTP) signal, and to output a turn-off signal to the first driving circuit, wherein output of the driving signal of the first driving circuit is turned off when one of an over-current situation and an over-temperature situation is happened.

11. The power source control circuit according to claim 1, wherein an iron core of the inductor is made of soft magnetic materials, which is flat cylinder with a concentric circle, wherein the iron core is coated with epoxy resin.

12. The power source control circuit according to claim 11, wherein the inductor further includes a first inductor (L11) and a second inductor (L12) in series connection with the first inductor, wherein the current detector is connected between the first inductor and the second inductor for detecting the output current.

13. The power source control circuit according to claim 12, wherein a weight of an iron core of the first inductor is ranging between 145 g to 165 g, and a weight of an iron core of the second inductor is ranging between 145 g to 165 g, wherein the output current can be greater than 50 A.

14. The power source control circuit according to claim 11, wherein when a direct current magnetizing force of the inductor is greater than a threshold value, a percentage of initial permeability decreases slowly and thereby presenting a nonlinear magnetic permeability.

15. The power source control circuit according to claim 11, wherein the inductor is manufactured by the iron core that is winded with numbers of turns of cylindrical coils by at least one of orthocyclic winding, helical winding and wild winding.

16. The power source control circuit according to claim 11, wherein the inductor is manufactured by the iron core that is winded with numbers of turns of flat coils by at least one orthocyclic winding, helical winding and wild winding.

17. The power source control circuit according to claim 1, wherein a weight of an iron core of the inductor is ranging between 290 g to 330 g, wherein the output current can be greater than 50 A.

* * * * *